United States Patent
Mitchell et al.

(10) Patent No.: US 9,572,414 B1
(45) Date of Patent: Feb. 21, 2017

(54) ADVANCED CASUALTY EVACUATION DEVICE

(71) Applicants: Timothy Mitchell, Columbia, MD (US); Ralph Jenkins, Baltimore, MD (US)

(72) Inventors: Timothy Mitchell, Columbia, MD (US); Ralph Jenkins, Baltimore, MD (US)

( * ) Notice: Subject to any disclaimer, the term of this patent is extended or adjusted under 35 U.S.C. 154(b) by 0 days.

(21) Appl. No.: 15/187,848

(22) Filed: Jun. 21, 2016

Related U.S. Application Data

(60) Provisional application No. 62/316,618, filed on Apr. 1, 2016.

(51) Int. Cl.
| | | |
|---|---|---|
| *A45F 4/02* | (2006.01) | |
| *A61G 1/013* | (2006.01) | |
| *A61G 1/044* | (2006.01) | |
| *F16B 1/00* | (2006.01) | |
| *A45F 4/04* | (2006.01) | |
| *A45F 4/08* | (2006.01) | |

(52) U.S. Cl.
CPC . *A45F 4/02* (2013.01); *A45F 4/04* (2013.01); *A45F 4/08* (2013.01); *A61G 1/013* (2013.01); *A61G 1/044* (2013.01); *F16B 1/00* (2013.01); *A45F 2004/026* (2013.01); *F16B 2001/0028* (2013.01)

(58) Field of Classification Search
CPC ........ A61G 1/013; A61G 1/0212; A61G 1/01; A61G 1/0231; A61G 1/044; A45F 3/04; A45F 4/02; A45F 4/04; A45F 4/08; A45F 2004/026; A61B 5/0015; F16B 1/00; F16B 2001/0028
See application file for complete search history.

(56) References Cited

U.S. PATENT DOCUMENTS

| | | | | |
|---|---|---|---|---|
| 4,124,908 A | * | 11/1978 | Burns | A61F 5/3776 2/69.5 |
| 6,871,368 B2 | * | 3/2005 | Calkin | A61G 1/01 5/625 |
| 8,118,201 B1 | * | 2/2012 | Calkin | A45F 3/047 224/156 |
| 9,066,840 B2 | * | 6/2015 | Bartholomew | A61G 1/01 |
| 2004/0221392 A1 | * | 11/2004 | Tsai | A45F 4/02 5/626 |
| 2008/0011798 A1 | * | 1/2008 | Cragg | A45F 3/04 224/576 |
| 2009/0313759 A1 | * | 12/2009 | Wong | A61G 1/01 5/627 |
| 2014/0144953 A1 | * | 5/2014 | Meier | A45C 7/0095 224/156 |

* cited by examiner

*Primary Examiner* — Corey Skurdal
(74) *Attorney, Agent, or Firm* — McKay & Associates, P.C.

(57) ABSTRACT

A pack with a variety of panels which can be deployed. A mid-panel is defined on the fabric housing. A head panel is attached to the mid-panel adapted to be folded and contained over the mid-panel. A leg panel is attached to the mid-panel adapted to be folded and contained over the mid-panel. The top finger loop is attached to the head panel and extends from the top. A bottom finger loop is attached to the leg panel extending from the bottom. Upon pulling the top finger loop and the bottom finger loop, the head panel and the leg panel, respectively, can be deployed from the fabric housing. A chest strap is deployable using an upper side finger loop. A waist strap is deployable using a lower side finger loop. The instant pack includes semi-rigid body boards contained over the mid-panel to add rigidity and enhance safety.

17 Claims, 5 Drawing Sheets

ADVANCED CASUALTY EVACUATION DEVICE

CROSS-REFERENCE TO RELATED APPLICATIONS

The instant application claims benefit of provisional application Ser. No. 62/316,618 filed Apr. 1, 2016, the contents of which are herein incorporated by reference.

BACKGROUND

Field of the Invention

The instant invention relates to back packs. Particularly, described is a pack device which is configurable into a variety of transport uses including an evacuation device to address and handle casualty events.

Description of the Related Art

Convertible back packs are known in the art. A convertible pack is shown by U.S. Pat. No. 4,331,272 to Ward wherein a back pack is formed from a folded sheet of fabric with the sheet constituting the floor of a tent. U.S. Pat. No. 6,173,621 to Casull shows a portable, inflatable floatation device for use as a back pack frame to maintain a standard backpack for hiking, with the frame being convertible into a floatation device and outrigger pontoon. U.S. Pat. No. 5,527,088 to Maclean teaches a combination back pack and chair.

The prior art teaches a variety of dual-function packs. U.S. Pat. No. 8,789,730 shows a backpack deployable as a stretcher. U.S. Pat. No. 4,885,812 is a combination backpack and cot. U.S. Pat. No. 4,431,121 is a game towing device/hoist.

Drawbacks in prior pack systems exist in as much as their functions are limited strictly to the traditional pack function and perhaps one or two other uses. They are not multi-functional. Moreover, most systems are not specifically suitable to be deployed as a safe, back and neck-supporting stretcher so although the fabric can be deployed and lengthened to support a lying individual, the positioning and mobility of the injured can be dangerous, especially while in motion, and even more so when it is critical the injured or fallen be moved rapidly as in the case of a hostile environment. Thus, the instant invention satisfies this and various other needs by employing various means for releasing components from the pack, with some of the components being semi-rigid but still concealable when not in use.

SUMMARY

The invention herein comprehends a pack which can be deployed to serve various transporting needs, especially needs related to the transport or evacuation of people. The device can be worn in various ways and can be deployed in up to four variations. When fully deployed in the carry position, a casualty of war, for example, will be able to be transported by one to six personnel depending on the strap configurations. The strap designs allow the carrying personnel, when they are also equipped with a device, to carry the casualty hands free, thus enabling them, in the case of tactical military or law enforcement situations, to have ready access to weapons and other gear as necessary while still transporting the victim.

Accordingly, comprehended is a pack, comprising a fabric housing having a front, a back, a top, a left side, a right side, and a bottom. A mid-panel is defined on the fabric housing forming substantially the back thereof. A head panel is attached to the mid-panel adapted to be folded and contained over the mid-panel. A leg panel is attached to the mid-panel adapted to be folded and contained over the mid-panel. The top finger loop is attached to the head panel and extends from the top. A bottom finger loop is attached to the leg panel extending from the bottom. Therefore, upon pulling the top finger loop and the bottom finger loop, the head panel and the leg panel, respectively, can be deployed from the fabric housing.

A chest strap includes a chest strap end and a chest buckle end. The chest strap end and the chest buckle end are engaged with the mid-panel proximate to the top and adapted to be folded and contained over the mid-panel. Further included on the pack are a pair of upper side finger loops. One of the upper side finger loops is attached to the chest strap end and extends from the left side of the fabric housing. The other of the upper side finger loops is attached to the chest buckle end and extends from the right side of the fabric housing, wherein upon pulling the upper side finger loops the chest strap can be deployed from the fabric housing. The waist having a waist strap end and a waist buckle end is adapted to be folded and contained over the mid-panel, deployed by including a pair of lower side finger loops, one of the lower side finger loops attached to the waist strap end and extending from the left side of the fabric housing, the other of the side lower side finger loops attached to the waist buckle end and extending from the right side of the fabric housing, wherein upon pulling the lower side finger loops, the waist strap is deployed from the fabric housing. The instant pack includes semi-rigid body boards contained over the mid-panel to add rigidity and enhance the safety of the transport.

DETAILED DESCRIPTION OF THE PREFERRED EMBODIMENT

Figure 1:
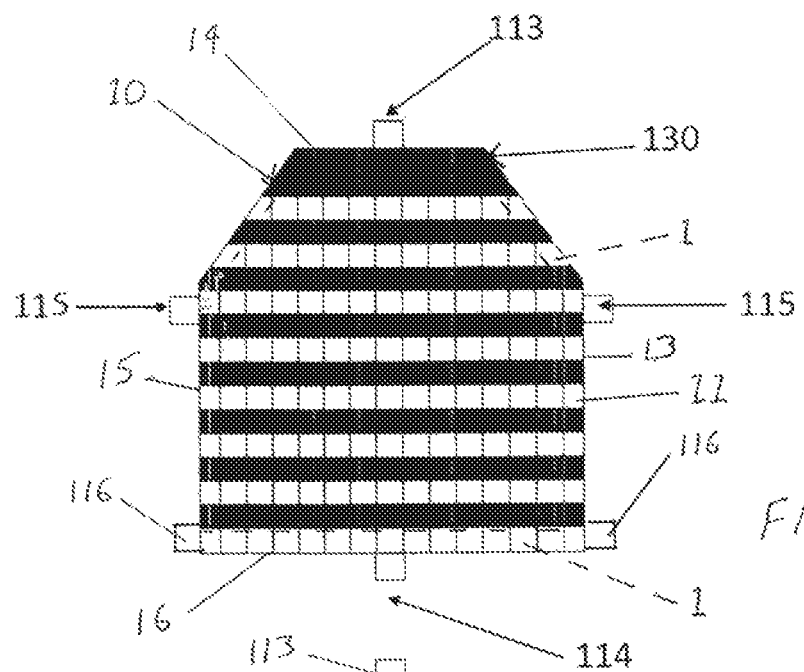
FIG. 1 shows a front elevation view of the instant pack in a closed, folded position.
Figure 2:
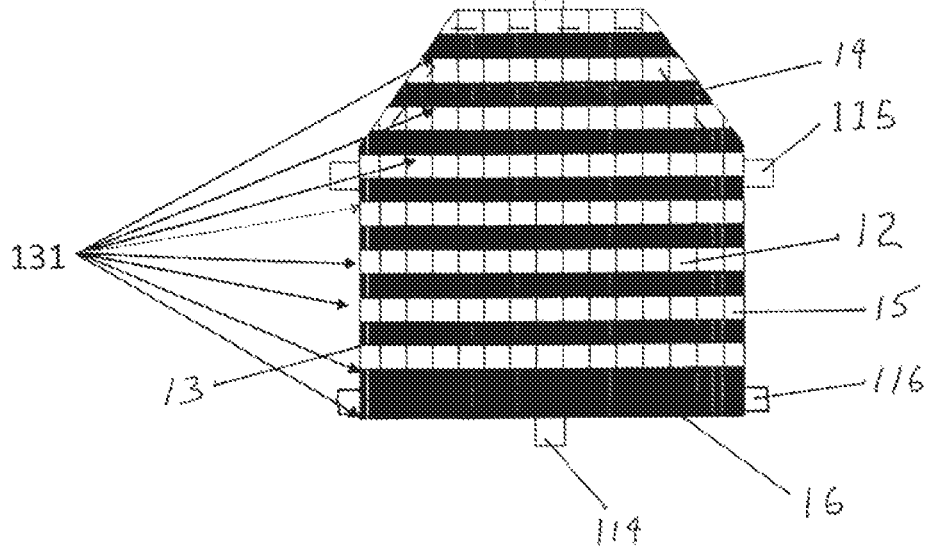
FIG. 2 shows a back elevation view of the instant pack in the same, closed and folded position.
Figure 3:
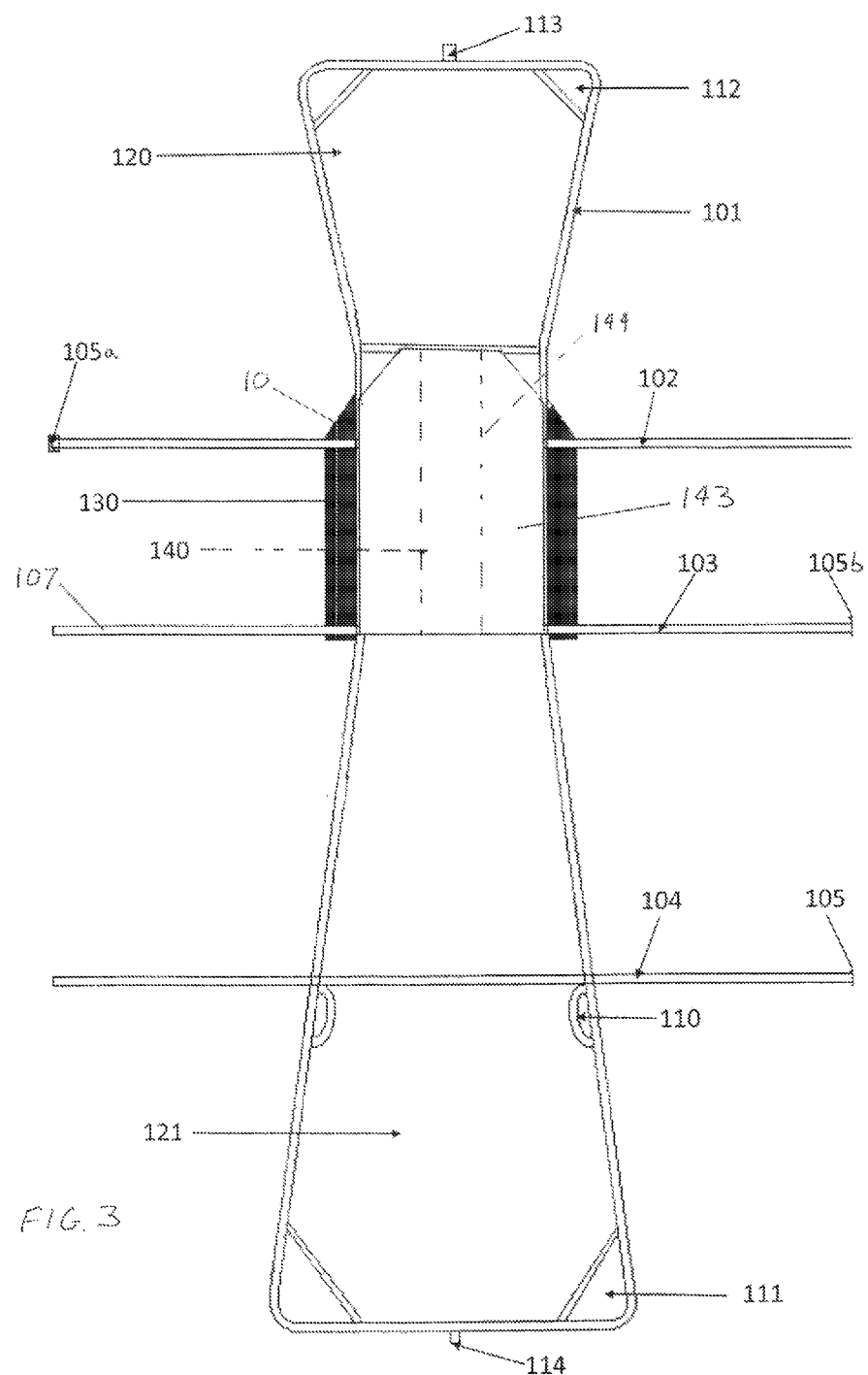
FIG. 3 shows a top elevation view of the pack deployed in a full body, carry position without the deployment of the semi-rigid body boards.
Figure 4:
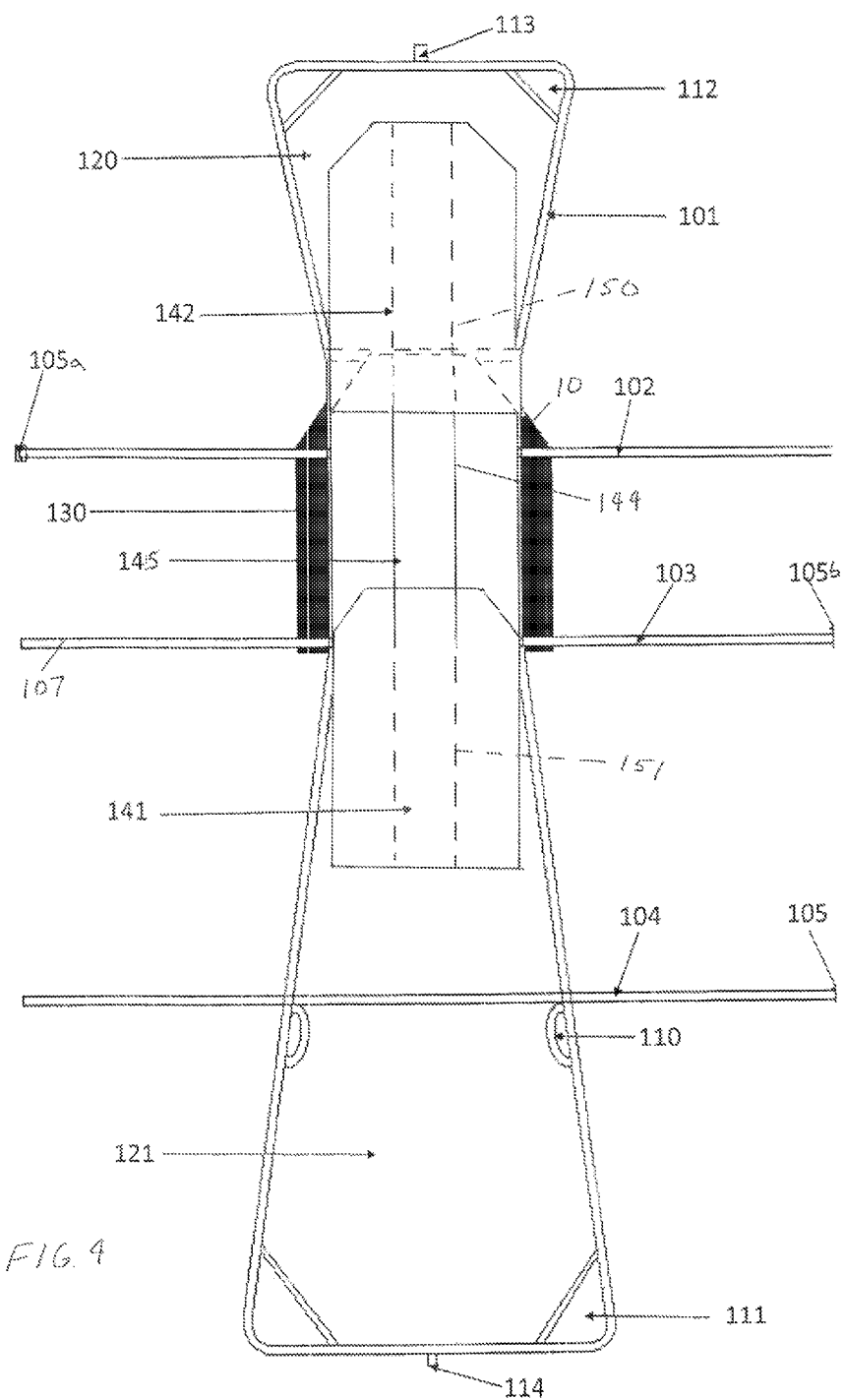
FIG. 4 shows a top elevation view of the pack deployed in a full body, carry position with the deployment of the body boards.
Figure 5:
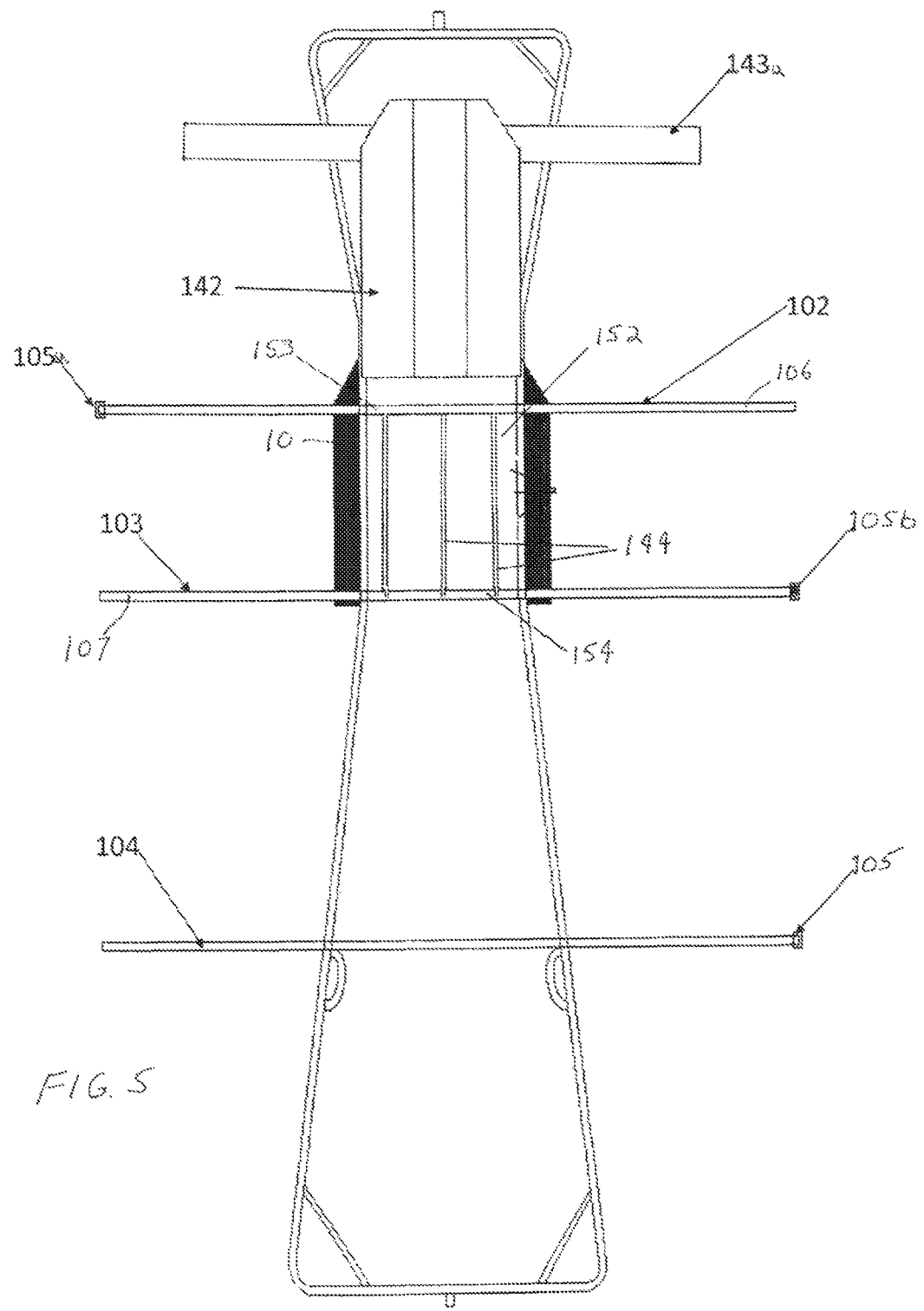
FIG. 5 shows a top elevation view of the pack deployed in an alternative, head-supporting only position also with the back board removed to reveal the pocket at the mid-panel.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated assembly, and such further applications of the principles of the invention illustrated herein, as would normally occur to persons skilled in the art to which the invention relates. This detailed description of this invention is not meant to limit the invention, but is meant to provide a detailed disclosure of a mode of practicing the invention.

Referencing then FIGS. 1-6, shown is the instant pack 130, designed to be worn in a closed, pack position. Pack 130 is generally a fabric housing 10 having a front 11, a back 12, a top 14, a left side 15, a right side 13, and a bottom 16. The shape of the fabric housing 10 or pack 130 may vary so the above locations are meant to provide a point of reference for various locations. For instance, as shown the top 14 may be angled on both sides providing for a hexagonal shape. The pack can be worn as a traditional back pack with shoulder straps, preferably detachable. Alternatively, the pack can accompany or be integrated on the back portion of readily available tactical body armor via MOLLE attachments 131, thus including a means for attaching modular equipment to the pack 130. Attachment points are affixed to the front 11 and back 12 of the pack 130 (or carrier) as shown. Although dimensions of course may vary, the attachment points are preferably made from 1 inch strap material that is affixed to the pack on a horizontal plane with one inch spacing between straps. Any all strap material, as further described, is affixed to the pack via vertical stitching spaced preferably evenly across the strap, for instance every one inch. Any and all finger loops can be made of 1-1.5" web material. Any and all strap and fabric material may vary but in the embodiment described herein is comprised of nylon. When mated to similarly designed attachments, and with the use of separate one inch or other commercially available vertical attachment pieces, the pack can be affixed to other items such as body armor or in turn can have other external pouches affixed to the pack carrier. Accordingly, the pack is disposed on a user as a traditional carrying device, but the structural make-up, as follows, allows it to be carried a variety of ways and can deployed into various uses.

The front 11 of the fabric housing 10 is partially connected to the back 12 using hook-and-loop fasteners 1 such as VELCRO®. "Partially connected" means the hook-and-loop fasteners 1 do not travel around the entire edges of the front 11, but rather the fasteners 1, in one embodiment, travel along the entirety of the top 14 and along the entirety of the bottom 16, thus the front 11 can be partially torn away from the back 12. The front 11 is stitched, or fixed, to the back 12 by being sewn thereto along the left side 15 and right side 13. In this manner, the front 11 can partially tear away from the back 12 at the top 14 and bottom 16 as above but still remain attached at its sides such that the components housed within the pack 130 can be deployed, or released, while the pack 130 does not completely split apart.

A mid-panel 140 is defined on the fabric housing 10 forming substantially the back thereof, meaning the mid-panel 140 is the surface of the pack 130 opposing the front 11, within the interior of the pack 130. In other words, if the front 11 were to be entirely removed, the mid-panel 140 would be the upmost, non-movable surface at the back 12 portion of the pack 130.

A head panel 120 is integrally attached to the mid-panel 140. Head panel 120 is a foldable, fabric panel which generally is of an inverted triangle for example with an area of least the area of the mid-panel 120 but can also be greater because it is foldable. Head panel 120 is adapted to be folded, contained, and maintained over the mid-panel 140 until it is deployed. For instance, because it is non-rigid, the head panel 120 can collapse down onto mid-panel 140 underlying front 11 when un-deployed. Alternatively, any number of seams can be defined to aid the collapsing or folding process. In the preferred embodiment, the outer perimeter of head panel 120 can be strengthened using a thicker nylon. In addition, head panel handles 112 can be defined by gaps through the fabric of head panel 120, for instance along the outer edge to which top finger loop 113 is attached. These head panel handles 112 not only aid in carrying the deployed pack 130 but allows the head panel 120 to be further secured to another individual, for instance carrying the same pack 130 such that the secondary user can transport an individual on the deployed pack, or stretcher, hands-free.

Head panel 120 is deployed to support the head of an individual. To deploy head panel 120 from fabric housing 10 (or pack 130), a top finger loop 113 is provided, attached to head panel 120 and extending from the top 14, "extending" meaning the top finger loop 113 protrudes from beyond the fabric housing 10 in a tab-like fashion, adapted to be grasped and pulled. Accordingly, upon pulling of the top finger loop 113, the head panel 120 is also pulled and the force of the head panel 120 breaks the hook-and-loop fastener 1 at the top 14 to partially separate the front 11 and back 12 (alternatively the separation may be done manually before pulling the top finger loop 113). As a result the head panel 120 is "deployed" from fabric housing 10.

A leg panel 121 is integrally attached to the mid-panel 140. Similar to head panel 120, leg panel 121 is a foldable, fabric panel which is generally triangular but having a greater relative area than head panel 120. Leg panel 121 is adapted to be folded, contained, and maintained over the mid-panel 140 until it is deployed. For instance, because it is non-rigid, the leg panel 121 can collapse down onto mid-panel 140 underlying front 11 when un-deployed. Leg panel 121 can be stacked over head panel 120 or head panel 120 can overlay leg panel 121 when both are un-deployed. Accordingly, each panel 120 or 121 is "contained over" mid-panel 140. Any number of seams can be defined to aid the collapsing process. In the preferred embodiment, the outer perimeter of leg panel 121 can be strengthened using a thicker nylon. In addition, leg handles 110 can be defined by gaps through the fabric of leg panel 121, for instance along the outer edge to which bottom finger loop 114 is attached. As with the heal panel handles 112, this facilitates carrying and further, secondary attachment.

Leg panel 121 is deployed to support the legs of an individual. To deploy leg panel 121 from fabric housing 10 (or pack 130), a bottom finger loop 114 is provided, attached to leg panel 121 and extending from the bottom 16, "extending" meaning the bottom finger loop 114 protrudes from beyond the fabric housing 10 in a tab-like fashion, adapted to be grasped and pulled. Accordingly, upon pulling of the bottom finger loop 114, the leg panel 120 is also pulled and the force of the leg panel 121 breaks the hook-and-loop fastener 1 at the bottom 16 to partially separate the front 11 and back 12 (alternatively the separation may be done manually before pulling the bottom finger loop 114). As a result the leg panel 121 is "deployed" from fabric housing 10.

A chest strap 102 is included having a chest strap end 106 and a chest buckle end 105a. The chest strap 102 can be a two-piece strap comprised of the chest strap end 106 and chest buckle end 105a each being separately attached to fabric housing 10 or be a one-piece strap traveling through the fabric housing 10, for instance through a defined pocket or seam, also termed herein pocket top seam 153. The chest strap 102 is thus "engaged" (in either instance) with the mid-panel 140 panel proximate to the top 14 as shown. The chest strap 102 is adapted to be folded and contained over the mid-panel 140 simply by folding and/or rolling it and tucking it into the fabric housing 10 between front 11 and back 12.

Chest strap 102 can be deployed and wrapped around the chest of an individual. To deploy chest strap 102 or each chest strap end 105a, 106, a pair of upper side finger loops 115 are provided, attached to chest strap 102 by having one upper side finger loop 115 extending from the right side 13 and another upper side finger loop 115 extending from the opposing left side 15 proximate to the top 14 in similar fashion as the other tabs but at this different location. "Proximate" here means preferably just below the point of transition where the top 14 angles as shown. As such, the upper side finger loops 115 and thus the chest strap 102 resides just below the hook and loop fastener 1. Accordingly, upon pulling of the upper side finger loops 115, the chest strap end 105a and chest buckle end 106 are pulled out from the fabric housing 10 (pack 130). As a result the chest strap 102 is "deployed" from fabric housing 10.

Much like the chest strap 102, a waist strap 103 is included having a waist strap end 107 and a waist buckle end 105b. The waist strap 102 can be a two-piece strap comprised of the waist strap end 107 and waist buckle end 105b each being separately attached to fabric housing 10 or be a one-piece strap traveling through the fabric housing 10, for instance through a defined pocket or seam, also termed herein pocket bottom seam 154. The waist strap 102 is thus "engaged" (in either instance) with the mid-panel 140 panel at the bottom 16 as shown. The waist strap 103 is adapted to be folded and contained over the mid-panel 140 simply by folding and/or rolling it and tucking it into the fabric housing 10 between front 11 and back 12, in this instance residing above or near the hook-and-loop fastener 1 at the bottom 16, thus it may not be directly along the bottom 16 to provide room for the fastener 1, but rather near the bottom 16.

Waist strap 102 is thus deployed to wrap around the waist of a carried individual. To deploy waist strap 102 or each waist strap ends 105b, 107, a pair of lower side finger loops 116 are provided, attached to waist strap 102 by having one lower side finger loop 116 extending from the right side 13 and another lower side finger loop 116 extending from the opposing left side 15 in similar fashion as the other tabs but at this different location. As such, the lower side finger loops 116 and thus the waist strap 102 reside near the hook and loop fastener 1. Accordingly, upon pulling of the lower side finger loops 116, the waist strap end 105a and waist buckle end 106 are pulled out from the fabric housing 10 (pack 130). As a result the waist strap 102 is "deployed" from fabric housing 10.

In addition to the non-rigid, fabric components of the head panel 120, leg panel 121, and mid-panel 140, includable within pack 130 are multiple, rigid or semi-rigid body boards 143 contained over the mid-panel 140. Body boards 143 include a back board 145, a head board 142, and a lower board 141. Either board 143 can be made of a rigid or semi-rigid material such as plastic, cardboard, or any polymer. Critical is that the body boards 143 are more rigid than the fabric components of the pack 130 to provide even further support to the carried individual, which is especially important if a neck or spinal injury necessitated this. For instance, back board 145 is retained in a stationary position over the mid-panel 140. In one embodiment a pocket 152 is defined over the mid-panel 140, wherein the back board 145 is fixed within the pocket 152. Referencing particularly FIG. 5, the pocket 152 is formed by having a pocket bottom seam 154 formed where the waist strap 103 travels across the fabric housing 10 near the bottom 16 with a pocket top of the pocket 152 defined by a pocket top seam 153 formed where the chest strap 120 travels across the fabric housing 10 as shown. Thus, the back board 145 can either be removably situated within pocket 152 or attached therein more permanently.

One of the body boards 143 is a head board 142. The head board 142 is movably connected to the pack 130 with one or more head board chords 150. "Movably connected" means the head board 142 is adapted to be stacked and disposed over back board 145 but then adapted to slide and move upward away from the back board 143 to overlay the head panel 120. This is allowed by providing the head board chords 150. Head board chords 150 are a flexible line or chord (e.g. 550 chord) which have their one end fastened to the head board 142 and the other ends fastened either directly to the pocket 152 (see FIG. 5) (or elsewhere on the pack 130 or back board 143). As such the head board 142 and back board 145 are in a stacked relation, movable, but with such mobility limited by the head board chords 150, which may vary in number (shown in FIGS. 3 and 4 as a pair, but shown in FIG. 5 in triplet).

Additionally, one of the body boards 143 is a lower board 142. The lower board 142 is also movably connected to the pack 130 with one or more lower board chords 151. As with the head board 142, "movably connected" means the lower board 142 is adapted to be stacked and disposed over back board 145 and head board 142 but then adapted to slide and move upward away from the back board 143 to overlay the leg panel 121. Lower board chords 151 are a flexible line or chord which have their one end fastened to the lower board 142 and the other ends fastened either directly to the pocket 152 (see FIG. 5) (or elsewhere on the pack 130 or back board 143).

Figure 6:
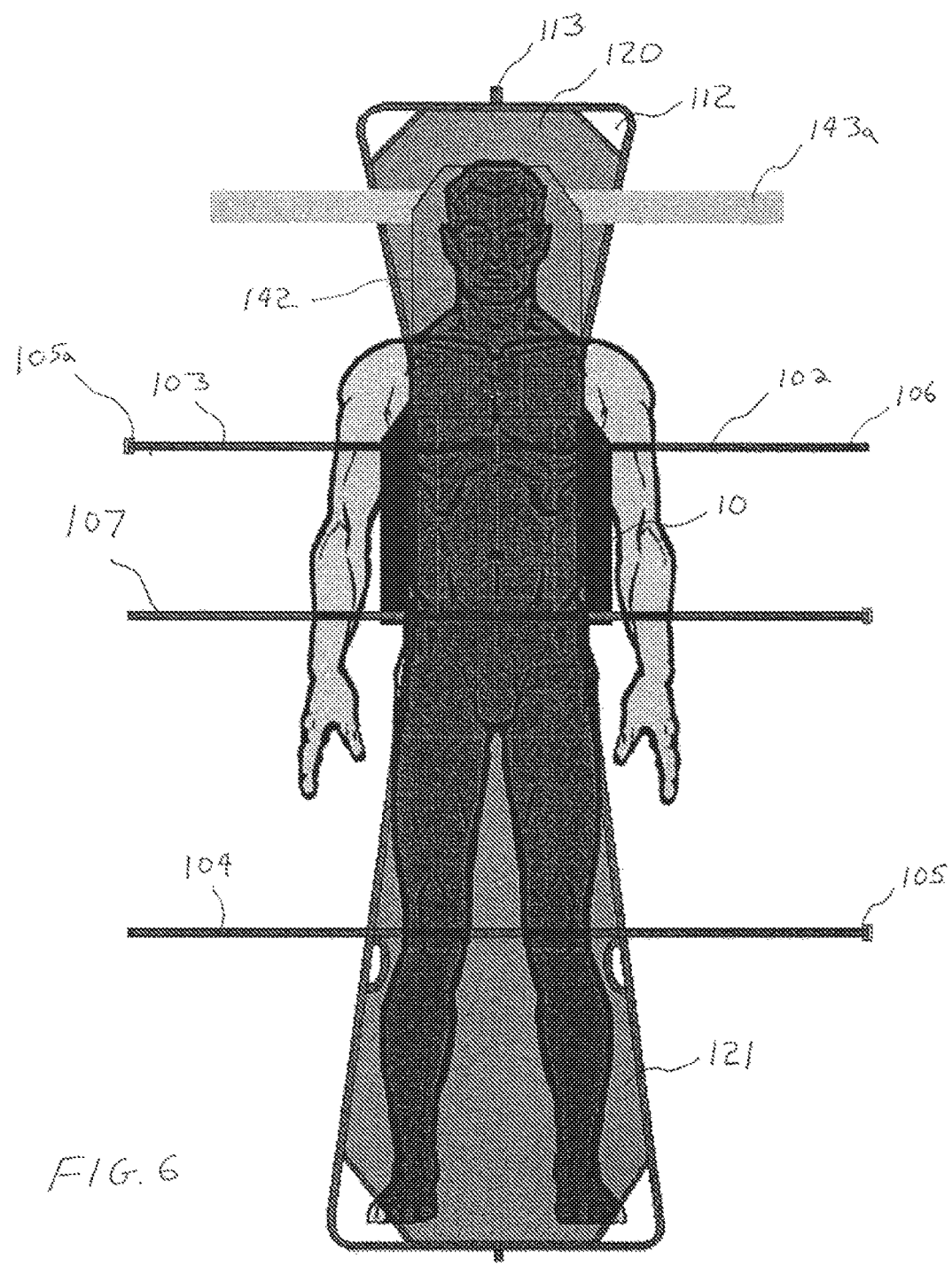
FIG. 6 is a depiction of the head only position in use with a person thereon.

In use then and with particular reference to FIG. 6, in an un-deployed form, pack 130 is worn as a traditional pack. In the event of a casualty or any circumstance requiring the need to transport a person, article, or animal (termed herein "individual" is meant to be all-encompassing), the pack 130 is "deployed", meaning the pack 130 is now transformed into a stretcher-like carrying device. To "deploy" the pack means to engage the various finger loops to reveal the aforementioned panels, thus the main design feature is to be able to manually deploy the pack in four (4) variations; 1—head only, 2—head and legs, 3—head/with spinal/head/neck immobility board, 4—Hoist capable configuration: such that in each configuration the deployed pack acts as a carrier or stretcher for a person (or animal or article). In a head only configuration the panels are deployed, but only with the head board 142 used to provide additional support. In the "head and legs" configuration the lower board 141 is also deployed over the already-deployed leg panel 121. In the third variation all boards are deployed, along with any additional stabilization straps 143a, and so on and so forth. The "hoist" configuration is one variation which allows, in the absence of the body boards 143, to join the end of the leg panel 121 up to the head panel handle 112 to thereby make a hoisting bag or diaper like configuration.

In addition, the device can also be utilized by outdoor enthusiasts as a hammock, as a make-shift shelter, as an equipment drag or in the case of hunters as a game drag. When fully deployed in the carry position, a casualty of war, for example, will be able to be transported by one to six personnel depending on the configurations. The straps can be fastened around the casualty at their respective positions. Ends of the deployed carrier can be fastened to any component of the transporting party or the transporting party can hand-carry the victim. The unique strap designs allow the carrying personnel, when they are also equipped with a device, to carry the casualty hands free, thus enabling them, in the case of tactical military or law enforcement situations, to have ready access to weapons and other gear as necessary. This is made possible because the carry handles 110, 11, 112 can receive the shoulder straps of other packs 130 and thus can be attached to the transporting party via several methods. If the transporting party is also equipped with a device, then that party can deploy their chest and waist straps in such a way as to cross the straps over their shoulders and across their chest forming a supportive X. Prior to connecting the chest and waist straps, the transporter should run the strap through the handles on the casualties device, which would join the transporters and the casualties devices in either a front facing or rear facing configuration, thus enabling the transporter(s) to transport the casualty in a hands-free configuration (not shown).

We claim:

1. A pack, comprising:
   a fabric housing having a front, a back, a top, a left side, a right side, and a bottom;
   a mid-panel defined on said fabric housing forming substantially said back thereof;
   a head panel attached to said mid-panel adapted to be folded and contained over said mid-panel;
   a leg panel attached to said mid-panel adapted to be folded and contained over said mid-panel;
   a top finger loop attached to said head panel and extending from said top;
   a bottom finger loop attached to said leg panel and extending from said bottom;
   wherein upon pulling said top finger loop and said bottom finger loop, said head panel and said leg panel, respectively, can be deployed from said fabric housing;
   a chest strap having a chest strap end and a chest buckle end, each said chest strap end and said chest buckle end engaged with said mid-panel proximate to said top and adapted to be folded and contained over said mid-panel; and,
   a pair of upper side finger loops, one of said upper side finger loops attached to said chest strap end and extending from said left side of said fabric housing, the other of said upper side finger loops attached to said chest buckle end and extending from said right side of said fabric housing, wherein upon pulling said upper side finger loops said chest strap can be deployed from said fabric housing.

2. The pack of claim 1, further comprising a waist strap having a waist strap end and a waist buckle end, each said waist strap end and said waist buckle end engaged with said mid-panel along said bottom of said fabric housing, said waist strap adapted to be folded and contained over said mid-panel.

3. The pack of claim 2, further comprising a pair of lower side finger loops, one of said lower side finger loops attached to said waist strap end and extending from said left side of said fabric housing, the other of said side lower side finger loops attached to said waist buckle end and extending from said right side of said fabric housing, wherein upon pulling said lower side finger loops, said waist strap is deployed from said fabric housing.

4. The pack of claim 3, further comprising multiple, semi-rigid body boards contained over said mid-panel.

5. The pack of claim 4, wherein one of said body boards is a back board retained in a stationary position over said mid-panel.

6. The pack of claim 5, further comprising a pocket defined over said mid-panel, wherein said back board is fixed within said pocket, said pocket having a pocket bottom seam formed where said waist strap travels across said fabric housing at said bottom with a pocket top of said pocket defined by a pocket top seam formed where said chest strap travels across said fabric housing.

7. The pack of claim 5, wherein one of said body boards is a head board, said head board movably connected to said back board with one or more head board chords and disposed over said back board, said head board adapted to move upward away from said back board to overlay said head panel.

8. The pack of claim 5, wherein one of said body boards is a lower board, said lower board movably connected to said fabric housing with one or more lower board chords and disposed over said back board, said lower board adapted to move downward away from said back board to overlay said leg panel.

9. The pack of claim 1, wherein said front is partially connected to said back using hook-and-loop fasteners, said hook-and-loop fasteners traveling between each said upper side finger loops along an entirety of said top, and said hook-and-loop fasteners traveling along an entirety of said bottom, such that upon deployment, said front is partially detached from said back.

10. The pack of claim 1, wherein said front is partially connected to said back by being sewn thereto along said left side and said right side below said upper side finger loops, such that upon deployment, said front remains partially fixed to said back.

11. The pack of claim 1, further comprising a means for attaching modular equipment to said pack.

12. A pack, comprising:
    a fabric housing having a front, a back, a top, a left side, a right side, and a bottom;
    a mid-panel defined on said fabric housing forming substantially said back thereof;
    a head panel attached to said mid-panel adapted to be folded and contained over said mid-panel;
    a leg panel attached to said mid-panel adapted to be folded and contained on over said mid-panel; and,
    wherein said front is partially connected to said back using hook-and-loop fasteners, said hook-and-loop fasteners traveling along said top and said bottom, wherein a remainder of said front is sewn to said back at said left side and said right side such that said front can partially detach from said back to allow for deployment of said head panel and said leg panel.

13. The pack of claim 12, further comprising:
    a top finger loop attached to said head panel and extending from said top;
    a bottom finger loop attached to said leg panel and extending from said bottom; and,
    wherein upon pulling said top finger loop and said bottom finger loop, said head panel and said leg panel, respectively, can be deployed from said fabric housing.

14. The pack of claim 12, further comprising:
    a chest strap having a chest strap end and a chest buckle end, each said chest strap end and said chest buckle end engaged with said mid-panel proximate to said top and adapted to be folded and contained over said mid-panel; and,
    a pair of upper side finger loops, one of said upper side finger loops attached to said chest strap end and extending from said left side of said fabric housing, the other of said upper side finger loops attached to said chest buckle end and extending from said right side of said fabric housing, wherein upon pulling said upper side finger loops said chest strap can be deployed from said fabric housing.

15. The pack of claim 12 further comprising:

a waist strap having a waist strap end and a waist buckle end, each said waist strap end and said waist buckle end engaged with said mid-panel along said bottom of said fabric housing, said waist strap adapted to be folded and contained over said mid-panel; and, a pair of lower side finger loops, one of said lower side finger loops attached to said waist strap end and extending from said left side of said fabric housing, the other of said side lower side finger loops attached to said waist buckle end and extending from said right side of said fabric housing, wherein upon pulling said lower side finger loops, said waist strap is deployed from said fabric housing.

16. The pack of claim 12, further comprising:

a back board retained in a stationary position over said mid-panel;

a head board, said head board movably connected to said fabric housing with one or more head board chords and disposed over said back board, said head board adapted to move upward away from said back board to overlay said head panel; and, a lower board, said lower board movably connected to said fabric housing with one or more lower board chords and disposed over said back board, said lower board adapted to move downward away from said back board to overlay said leg panel.

17. The pack of claim 12, further comprising a means for attaching modular equipment to said pack.

\* \* \* \* \*